(12) United States Patent
Li

(10) Patent No.: US 6,885,414 B1
(45) Date of Patent: Apr. 26, 2005

(54) OPTICAL ROUTER SWITCH ARRAY AND METHOD FOR MANUFACTURE

(75) Inventor: Le Li, Yorktown Heights, NY (US)

(73) Assignee: Kent Optronics, Inc., Fishkill, NY (US)

(*) Notice: Subject to any disclaimer, the term of this patent is extended or adjusted under 35 U.S.C. 154(b) by 273 days.

(21) Appl. No.: 09/968,201

(22) Filed: Oct. 1, 2001

Related U.S. Application Data

(60) Provisional application No. 60/236,994, filed on Sep. 29, 2000.

(51) Int. Cl.[7] ............ G02F 1/1347; G02F 1/1335; G02F 1/13; C09K 19/02; G02B 5/32
(52) U.S. Cl. ............ 349/74; 349/113; 349/177; 349/185; 349/201; 359/15; 359/432
(58) Field of Search ............ 385/16–23, 24, 385/10, 31, 36, 37; 359/1, 15, 34, 432; 349/175, 177, 185, 196, 74, 201, 113

(56) References Cited

U.S. PATENT DOCUMENTS

| | | | |
|---|---|---|---|
| 4,991,924 A | * 2/1991 | Shankar et al. | 349/196 |
| 5,200,845 A | 4/1993 | Crooker et al. | 359/51 |
| 5,251,048 A | 10/1993 | Doane et al. | 359/51 |
| 5,384,067 A | 1/1995 | Doane et al. | 252/299.01 |
| 5,437,811 A | 8/1995 | Doane et al. | 252/299.01 |
| 5,453,863 A | 9/1995 | West et al. | 359/91 |
| 5,680,233 A | 10/1997 | Faris et al. | 359/41 |
| 5,691,789 A | 11/1997 | Li et al. | 349/98 |
| 5,695,682 A | 12/1997 | Doane et al. | 252/299.01 |
| 5,745,203 A | * 4/1998 | Valliath et al. | 349/113 |
| 5,748,272 A | * 5/1998 | Tanaka et al. | 349/86 |
| 5,748,277 A | 5/1998 | Huang et al. | 349/169 |
| 5,847,798 A | 12/1998 | Yang et al. | 349/169 |
| 5,852,589 A | 12/1998 | Wilson et al. | 367/157 |
| 5,875,012 A | * 2/1999 | Crawford et al. | 349/74 |
| 5,877,826 A | 3/1999 | Yang et al. | 349/36 |
| 6,061,122 A | * 5/2000 | Hoshino et al. | 356/71 |
| 6,166,800 A | * 12/2000 | Silverstein et al. | 349/201 |
| 6,317,189 B1 | * 11/2001 | Yuan et al. | 349/176 |
| 6,538,775 B1 | * 3/2003 | Bowley et al. | 359/3 |
| 2001/0033400 A1 | * 10/2001 | Sutherland et al. | 359/15 |

* cited by examiner

Primary Examiner—Tarifur R. Chowdhury
(74) Attorney, Agent, or Firm—Klauber & Jackson

(57) ABSTRACT

An optical router switch array includes a plurality of switchable mirror elements having holographic liquid crystal arranged in stack cells. Each of the mirror elements is isolated electrically from the other switchable mirror elements by a plurality of substrates alternative arranged between the switchable mirror elements. Holographic gratings are formed on the holographic liquid crystal by exposure to holography at predetermined incident angles. A single switchable mirror element can also be provided in cases where an array is not required. The switchable mirror elements are polarization insensitive, stable within the operational spectral region, and stable versus temperature. The invention also includes methods for manufacturing a single switchable mirror element and the optical arrray.

54 Claims, 15 Drawing Sheets

OPTICAL ROUTER SWITCH ARRAY AND METHOD FOR MANUFACTURE

This application claims priority from U.S. provisional application 60/236,994 filed Sep. 29, 2000.

BACKGROUND OF THE INVENTION

1. Field of the Invention

The present invention relates to an optical switch array made from single layer electrically switchable mirror that is made from holographic cholesteric liquid crystal and is polarization independent.

2. Description of the Related Art

Today's fast growing optical telecommunication technology requires sophisticated optical switch and switch array. Currently, electro-mechanical switches are widely deployed in the optical fiber network. These switches are bulky and slow in switching speed. In addition, their maintenance cost is high. Therefore, new technologies are being sought that over perform the electro-mechanical switches. Such a high performance optical switch array should exhibit non-moving parts in a fully integrated form, fast switching speed, low insertion loss, low cross talk, low polarization dispersion loss, high manufacture capability, and low cost.

Several state-of-the-art technologies have been or are being developed that offer some unique performance aspects. The first and most promising technology is invented by Agilent as disclosed by, J. E. Fouquet, "Compact optical cross-connect switch based on total internal reflection in a fluid-containing planar lightwave circuit", OFC'2000, Baltimore, Md., Mar. 5–10, 2000, which is a fully integrated optical switch array consisting of an optical wave-guide in which a special liquid is filled. At the bottom of each intersection of two wave-guides, there is a "micro-thermal boiler". If a switch action is desired at the spot, the "boiler" heats the liquid to the boiling point so that air bubble is created. The generated air bubble behaves like a mirror that reflects light beam into the desired wave-guide channel. However, this device consumes significant electric power and its long-term stability as well as environment stability remains questionable. The second technology is based on micro-mirror which is fabricated via micro-electrical mechanical system (MEMS) technology as disclosed by, JDS-U, Exhibition in NFOEC'2000, Denver, Colo., Aug. 27–Aug. 31, 2000 and Nortel, Exhibition in NFOEC'2000, Denver, Colo., Aug. 27–Aug. 31, 2000. This switch technology features very low insertion loss, low polarization dispersion loss and fast switching speed. However, it is difficult to accurately align the optical beams being switched between the input and output ports. In addition, its long-term lifetime remains questionable because of the mechanical motion of the mirror. The third technology is based on thermal-electric technology that switches light via thermal induced index change as disclosed by, Mitsuhiro makilara, Fusao Shimokawa, and Kazumasa Kaneko, "Strictly Non-Blocking N×N Thermo-Capillarity Optical Matrix Switch using Silica-based Waveguide", OFC'2000, Baltimore, Md., Mar. 5–10, 2000. Again, this technology is slow and consumes high power and its thermal stability remains a question. The forth technology is based on liquid crystal phase shifter/rotator as disclosed by, Corning, Exhibition in NFOEC'2000, Denver, Colo., Aug. 27–31, 2000 and SpectraSwitch, Exhibition in NFOEC'2000, Denver, Colo., Aug. 27–Aug. 31, 2000 and Chorum, Exhibition in NFOEC'2000, Denver, Colo., Aug. 27–Aug. 31, 2000. This technology switches light without involving moving parts and is relatively fast. FIG. 1 shows the schematic diagram of the switch which is copied from the SpectraSwitch website.

In order to accomplish one switch action of a light beam, numerous optical components have to be used. The light has to pass a passive polarizing beam splitter to be split into two beams with orthogonal polarization states. Each beam has to pass an active liquid crystal phase retarder/rotator so that their polarization is modulated. Next, each beam has to be reflected by a mirror. Finally, the two beams pass another passive beam splitter where they are combined to become one single beam again. Modulation of the liquid crystal phase retarder/rotator determines the output direction of the final beam from the second beam splitter. Due to the fact that six optical elements (two beam splitters, two LC modulators and two mirrors) are involved in accomplishing one switching action, this switch exhibits a significant insertion loss. In addition, the switch is bulky and difficult for manufacturing. Furthermore, the optical modulation by the liquid crystal phase shifter or rotator is not flat within the operation spectral region (i.e., from 1,240 nm to 1,640 nm). Significant optical cross talk is expected at the wavelengths outside the liquid crystal bandwidth where the liquid crystal modulation is not sufficient. Besides, this technology has the same beam alignment problem as in MEMs technology. Finally, since this technology intrinsically depends on polarization of the light, its polarization dispersion loss is significant.

SUMMARY OF THE INVENTION

In order to overcome the disadvantages related to the mentioned prior art technologies, the present invention provides a new technology comprising an optical switch array, which is based on a single layer electrically switchable optical mirror, wherein the switchable optical mirror is further created from a holographic device made from cholesteric liquid crystal composite material. The switchable mirror of the present invention is polarization insensitive, stable within the operational spectral region, and stable versus temperature. In addition, the switchable mirror of the present invention is fully integrated and features no-moving parts (as compared to MEMs technology), simple configuration, low insertion loss, low polarization dispersion loss, low cross talk, rigidity, high manufacture capability (as compared the prior art liquid crystal technologies), low power consumption (as compared to air bubble technology), fast switching speed (as compared to thermal technology), and low cost (versus all the mentioned technologies).

In a broad aspect of the invention, a switchable mirror comprises:

a switchable mirror element comprising a liquid crystal;

pixilated electrodes in electrical connection with said switchable mirror element plurality;

a substrate material arranged on top and below said switchable mirror element;

wherein said liquid crystal is exposed to holography at predetermined incident angles to form holographic gratings having a predetermined pattern.

In another broad aspect of the invention, an optical router switch array according to the present invention comprises:

a plurality of switchable mirror elements comprising a liquid crystal in stacked cells;

each one mirror element of said plurality of switchable mirror elements including pixilated electrodes that are electrically isolated from pixilated electrodes of other switchable mirror elements of said plurality of switchable mirror elements;

a plurality of substrates alternatively arranged between said plurality of mirror elements so that said each one mirror element is separated from said other mirror elements by the arrangement of said plurality of substrates.

The liquid crystal in the stacked cells may be exposed to holography either individually or in groups at predetermined incident angles to form holographic gratings having predetermined patterns.

In yet another broad aspect of the invention, a method for manufacturing a holographic switchable mirror comprising the steps of:
   (a) mixing a liquid crystal material and a pre-polymerized liquid crystal at a predetermined ratio;
   (b) filling a glass cell with the mixture from step (a);
   (c) forming an interference pattern on the mixture by exposing the glass cell to holographic light from two light beams at predetermined angles for a predetermined amount of time;
   wherein said predetermined angles of said two light beams are propagated in opposite directions that converge in the mixture in the glass cell.

In yet still another broad aspect of the invention, a method for manufacturing an optical router switch array comprising the steps of
   (a) providing a plurality of switchable mirror elements comprising a liquid crystal housed in a plurality of stacked cells;
   (b) providing a plurality of substrates which are alternately arranged with said stacked cells so that each one of said plurality of switchable mirror elements is arranged between two substrates of said plurality of substrates and separated from switchable mirror elements of all other stacked cells of said plurality of stacked cells;
   (c) providing pixilated electrodes for said each one of said plurality of switchable mirror elements which are electrically insulated from pixilated electrodes of said all other mirror elements of said plurality of switchable mirror elements; and
   (d) exposing the liquid crystal to holography at predetermined angles from at least two incident beams to form holographic gratings having a predetermined pattern.

The exposure to holography can be made individually for each of the switchable mirror elements, in groups, or all at once.

The liquid crystal used is preferably cholesteric but a nematic liquid crystal can be used.

Moreover, the switchable mirror of the present invention eliminates the beam mis-alignment problem between the input and output ports that occurs in prior art switches, such as the MEMs based switch technology. The present invention provides advantages over the prior art with regard to increased data transfer speed and capacity, reduced system weight, and reduced cost for system deployment, as well as maintenance.

Accordingly, the invention comprises in a first aspect, a single unit switchable mirror that is characterized by Bragg gratings of identical orientation. In a second aspect, the invention relates to a multiple unit switchable mirror with a plurality of layers and Bragg gratings, where the Bragg gratings are of identical orientation. Yet further, the invention includes a switch array comprising a plurality of single/multiple switchable mirrors, which array is also characterized by the identical orientation of all Bragg gratings. The invention also extends to the method of fabrication of the switchable mirrors and the switch array by the application of one or more sets of oppositely originating beams and their convergence on the respective devices during fabrication, all as illustrated and described herein. The invention also provides a novel packaging technique to fabricate the optical switch array device that intrinsically avoids the beam mis-alignment problem.

The accompanying description and drawings are directed to a high performance optical switch device, a method to create a single layer polarization independent switchable mirror, and a method for creating a multiple layer polarization independent switchable mirror, and the multiple layer mirror prepared thereby.

DETAILED DESCRIPTION OF THE PREFERRED EMBODIMENT

It is appreciated and understood by persons of ordinary skill in the art that the following description is for purposes of illustration and not for limitation. So as not to obscure the description of the invention, procedures and processes known to persons of ordinary skill in the art are referred with sufficient clarity for the artisan to practice the claimed invention.

A first embodiment of this invention is directed to with an electrically switchable mirror that is made from a cholesteric liquid crystal under holographic condition. According to the present invention the switchable mirror features a single layer configuration, and has the following properties: (a) it reflects unpolarized light, i.e., it is polarization insensitive, (b) it has a broadened spectral bandwidth of reflection, (c) it has a saturated reflectivity, and (d) it has multiple reflection peaks.

Figure 1:
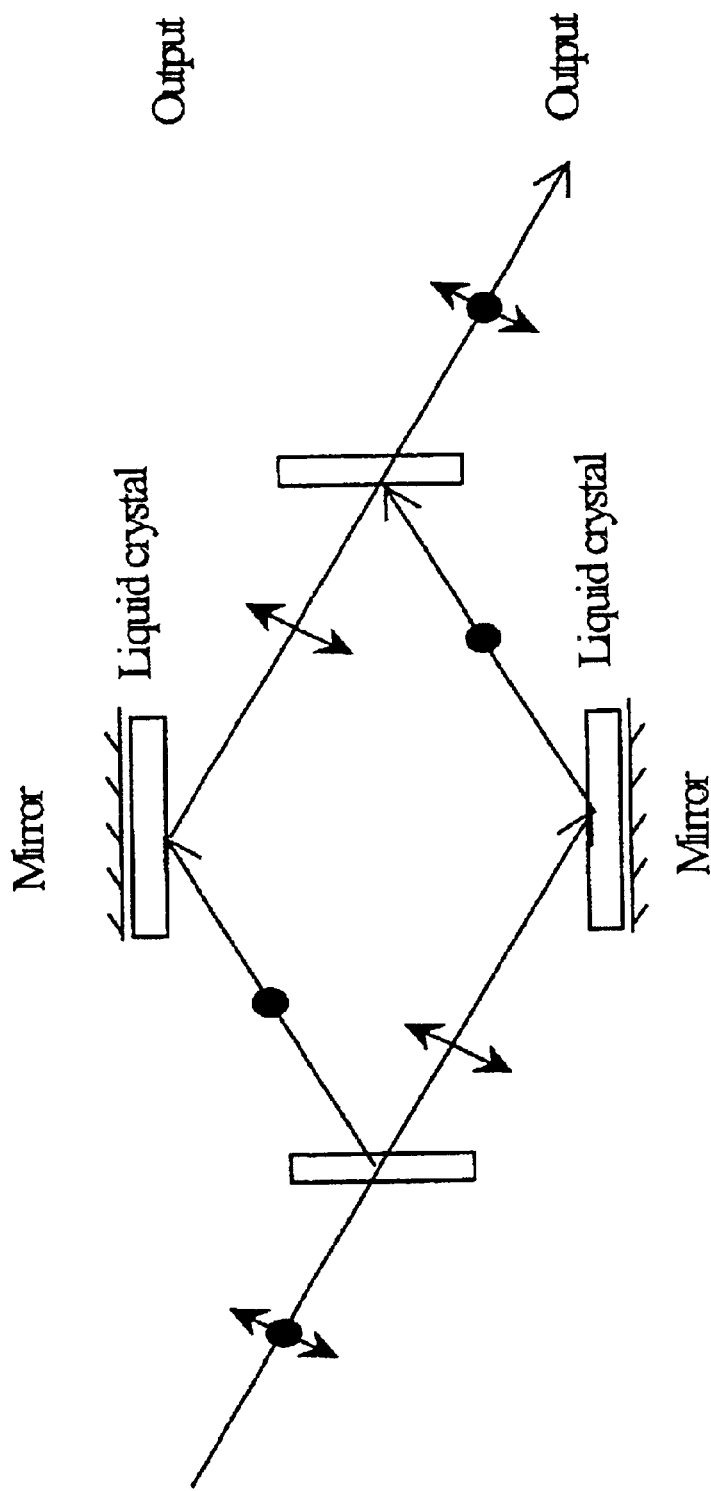
FIG. 1 is a schematic illustration of a prior art optical switch using a liquid crystal.
Figure 2:
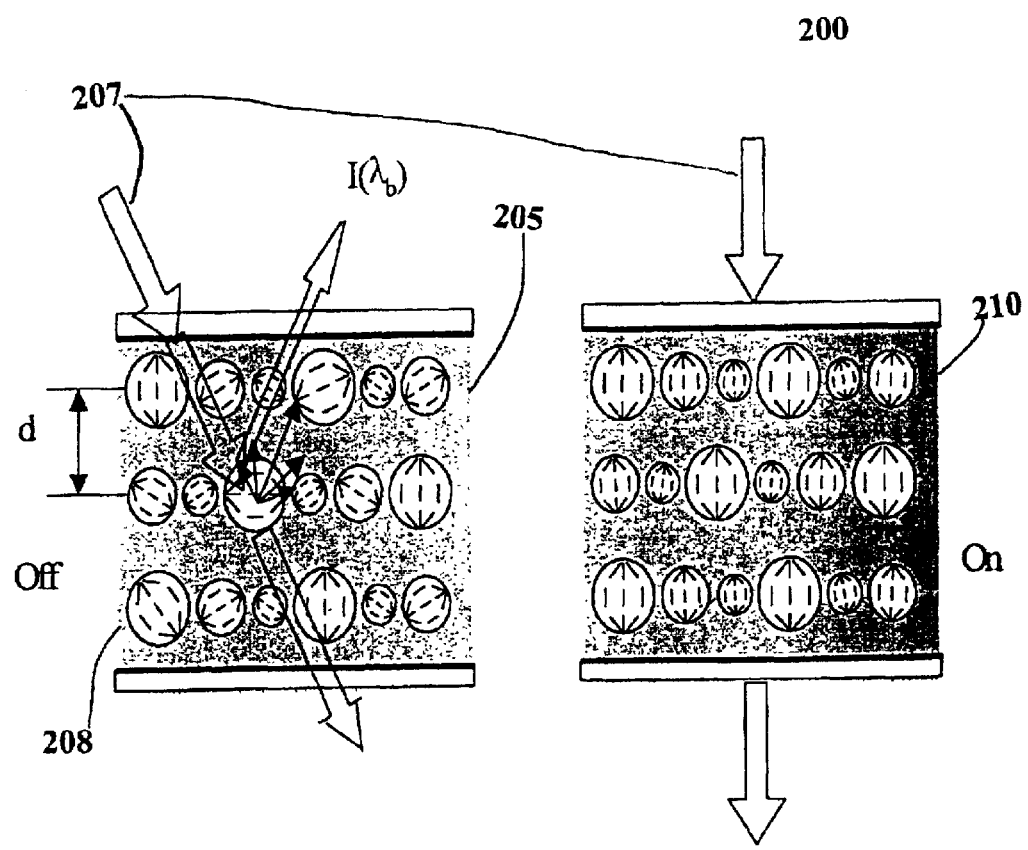
FIG. 2 is a schematic illustration of a prior art holographic polymer dispersed liquid crystal structure.

There are several known technologies which can be employed to make the switchable mirror of the present invention. The first method is called holographically formed polymer dispersed liquid crystal, or H-PDLC. H-PDLC's as disclosed by V. Natarajan, R. L. Sutherland, V. P. Tondiglia, T. J. Bunning, and W. W. Adams, Jounal of Non-Linear Optical Physics and Materials$_5$, 89 (1996) and G. P. Crawford, T. G. Fiske, and L. D. Silverstein, Journal of the SID$_5$, 45 (1997) are a variant of polymer dispersed liquid crystals (PDLCs) formed under holographic conditions. FIG. 2 illustrates a holographic polymer dispersed liquid crystal structure, wherein the LC structure 205, 210 are the two states of operation. The holography introduces a periodic array of liquid crystal droplets (with diameters of 20 nm–200 nm) and solid polymer planes with an interference fringe spacing d. As shown by the LC structure 205, when no voltage applied, the LC directors 207 are misaligned. Since the refractive index of the LC droplets ($n_{LC}$) is different from that of the polymer planes ($n_p$), light 208 is scattered at the droplet interface. Due to the periodic modulation in the refractive index, light at the Bragg wavelength is reflected back to the observer. However, as shown in LCD structure 210, when a voltage is applied, the liquid crystals inside the droplets are aligned along the field direction, assuming that the LC has a positive dielectric anisotropy. Therefore, the liquid crystal index becomes $n_{lco}$. If $n_{lco}$ is equal to $n_p$, the periodic refractive index modulation disappears and the incident light is transmitted. As a result, the device becomes transparent, realizing the switching of the device.

The use of conventional H-PDLC has the following drawbacks. First, it has a relatively low efficiency. For example, the maximum reflectivity H-PDLC is reportedly only around 70%. This is due to the fact that the Bragg reflection originates from the interference among the scattered light from liquid crystal planes. In addition, the liquid crystal droplet boundary is not sharp. Therefore, it is difficult for such scattered light to be perfectly in-phase to give rise to a high reflectivity. Second, it has a high switching voltage, around the order of 5V per micron of film thickness. The reason is because of the small liquid crystal droplet size, on the order of 20 nm–200 nm. The switching voltage is reversibly proportional to the droplet size. Third, H-PDLC has only one switching mode, i.e., the normal mode, which means that the device is reflective in the absence of an electric field. Fourth, H-PDLC reflection spectrum can not be tuned. Finally, as in conventional PDLC, this device shows a noticeable haze in the transparent state, particularly at a larger viewing angle, due to the index mis-matching between droplets and polymer at large angle.

Figure 3:
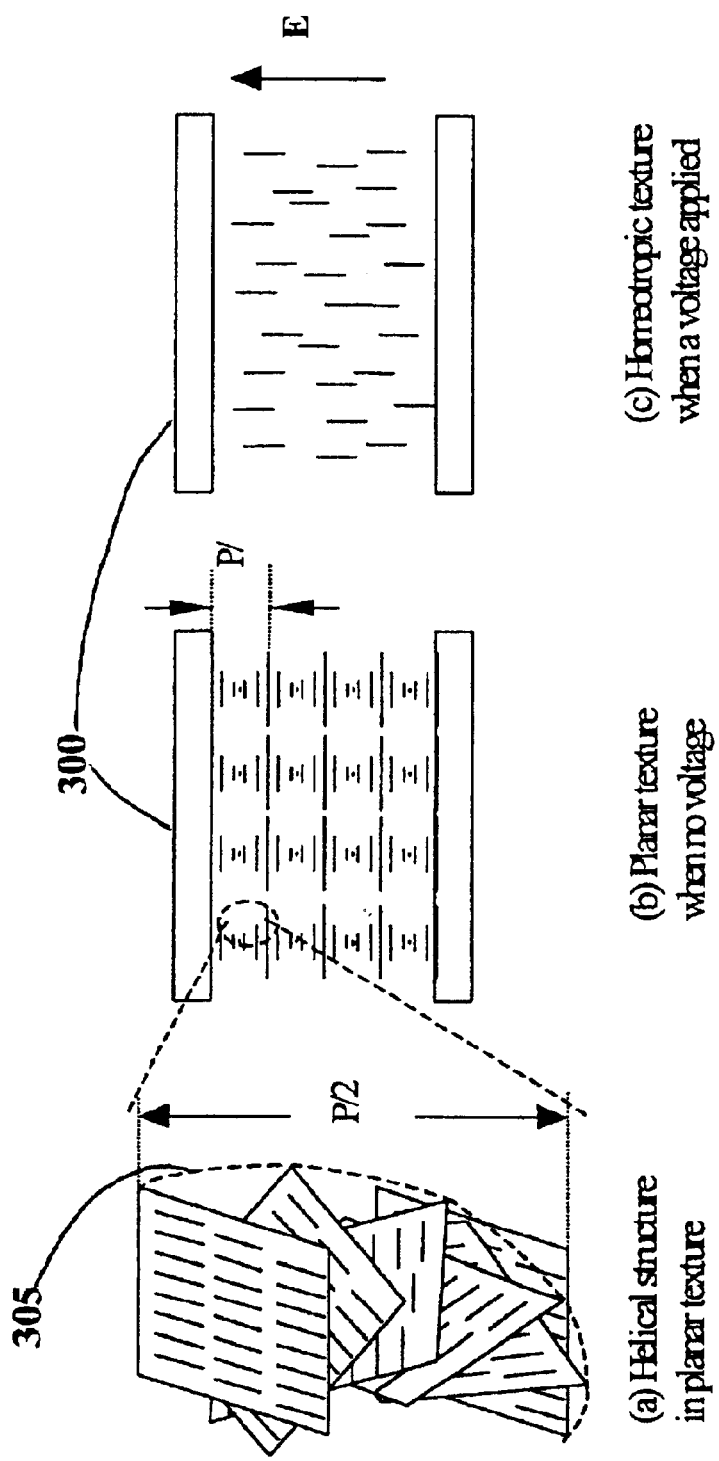
FIGS. 3($a$)–3($c$) illustrate basic alignment of texture of a CLC Film.

The second method for constructing a switchable mirror is based on using a cholesteric liquid crystal. FIGS. 3(*a*) and 3(*c*) show how conventional CLC's 300, when in a planar alignment which, adopt a spiral arrangement 305 to form a uniform helical structure with a pitch "P". Such a helical structure results in a light reflection at a center wavelength $\lambda_o = n_a P$ with a natural bandwidth given $\Delta\lambda_t = \Delta n\, P$ where "P" is the helix pitch. The bandwidth $\Delta\lambda$ is mainly determined by the CLC birefringence $\Delta n$. 50% of the unpolarized incident light within the band is reflected into a circular polarization state that has the same handedness as the CLC spiral, while the remaining 50% is transmitted with the opposite polarization state. The light outside the bandwidth will pass the CLC 100% regardless of its polarization state. Depending on the CLC material, the narrow band polarizing state can be either electro-optically passive (non-switchable) if the CLC is polymerized to form a solid film (see FIG. 3(*a*) and (*b*)). Or, it can be electro-optically active (switchable) if the CLC is made from non-polymeric low molecular weight (LMW) liquid crystal. Usually, the switchable CLC is in a planar texture under zero voltage (see FIG. 3(*a*) and (*b*)). When it is switched by an electric field, all the CLC molecules are untwisted and aligned along the field direction so that it becomes transparent (see FIG. 3(*c*)).

Figure 4:
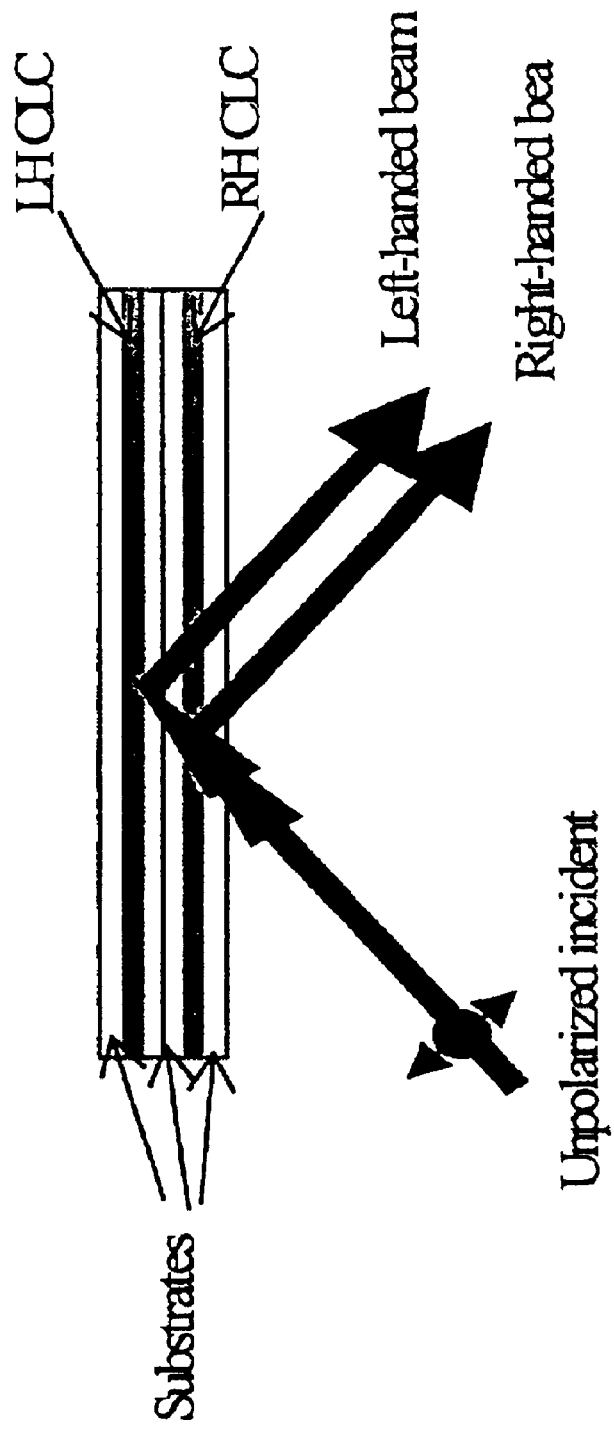
FIG. 4 is a schematic illustration of the light reflection from the switchable mirror made from cholesteric liquid crystal, where the reflected beam is spatially displaced.

Another method would be to use two switchable CLCs with opposite handedness to build a switchable mirror by stacking them together. However, since this mirror has a double layer structure, the reflected beam is actually comprises two separate beams with opposite circular polarizations. One beam is reflected from the first CLC while the second beam is reflected from the second CLC, as shown in FIG. 4. The two beams are spatially displaced, which becomes even more pronounced when the light is incident at a large angle. This kind of beam displacement makes this method less desirable for building a switch for optical communication than the other aforementioned methods.

Another way to construct a holographic device has been made from cholesteric liquid crystal composite materials consisting of polymeric and non-polymeric liquid crystal compounds together with chiral additives has been disclosed by M. Date and T. Hisaki, "Helical Aligned holographic polymer dispersed liquid crystal (HPKLC)", Asia Display'2000, Japan. The device was fabricated by putting liquid crystal mixture into the space between two glass plates with anti-parallel rubbed polyimide layers and irradiating it with interferential fringes of laser light. The helical pitch was much shorter than the spacing. Initially, the mixture was helically aligned in the glass cell. The laser radiation formed a polymer network periodically corresponding to the interferential fringes since polymerization occurs at fringe peaks. It has been claimed that the device was transparent under zero voltage. When an electric field was applied, a dip in the transmission spectrum was observed that corresponds to the diffraction. It was further claimed that the polarization dependence of this device was reduced. However, the reflectivity is low. Also, the technique for fabrication of the presented device is not disclosed, and the devices thus prepared are believed to be different.

More recently, U.S. Pat. No. 6,133,971 by Silverstein et al, which is incorporated by reference as background material describes the concept of constructing a holographically formed reflective display comprising a plurality of anisotropic polymers sheets, formed from at least a photo-active monomer and a photo initiator, that separate a liquid crystal material into a plurality of liquid crystal material regions. The resultant device reflects at least one selective wavelength of light. It is claimed that both nematic liquid crystal and/or cholesteric liquid crystal can be used to make the device.

(First Embodiment) Switchable Mirror

Figure 5:
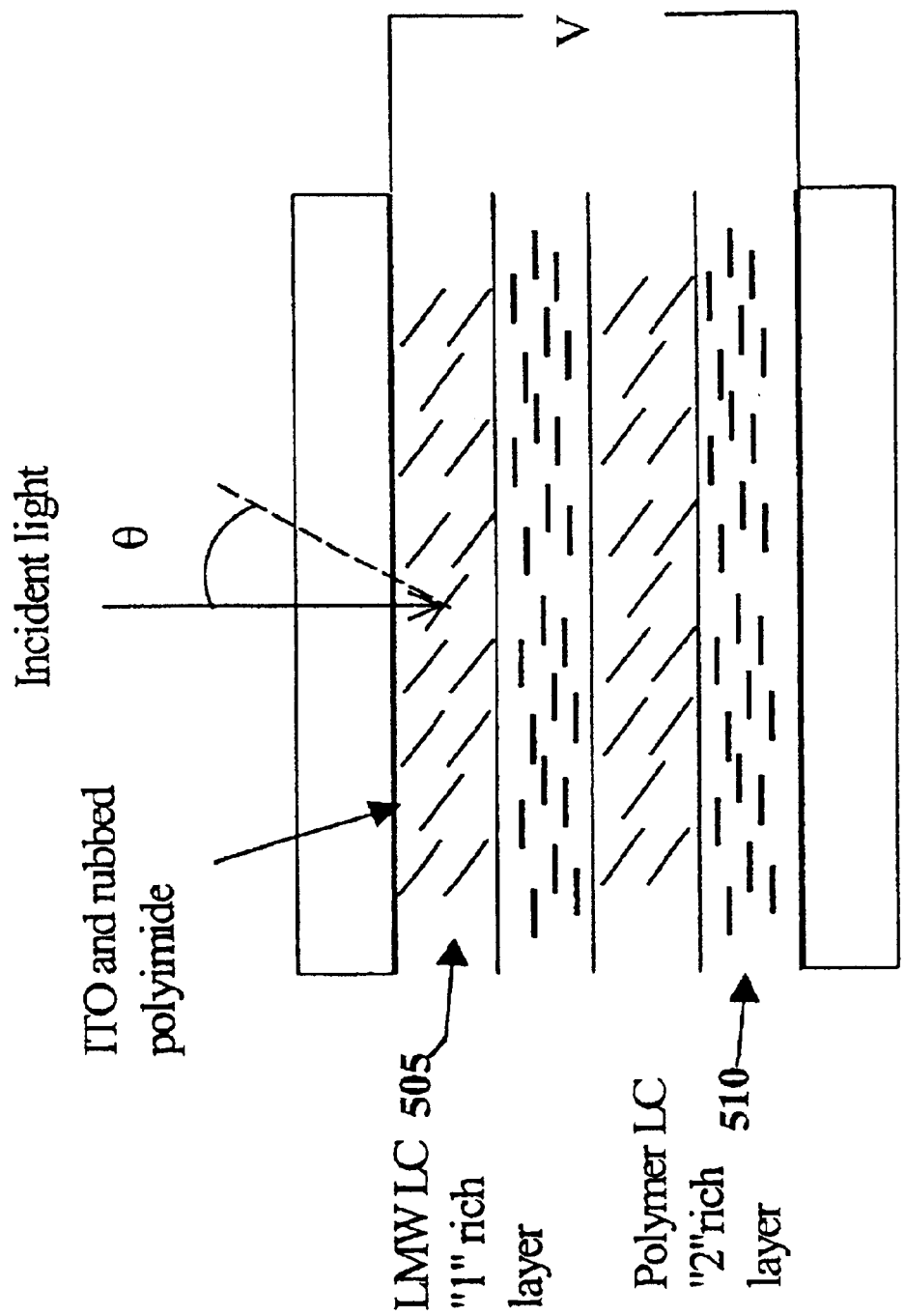
FIG. 5 is a schematic illustration of the new holographic liquid crystal device according to the present invention whose reflection spectrum is electrically tunable.

FIG. 5 illustrates the first embodiment of the present invention of creating a holographically formed switchable mirror from liquid crystal in a nematic phase whose reflection peak is tunable via varying the strength of the applied electric field across the device.

At zero voltage, both LMW liquid crystal (LC) 505 and liquid crystal polymer 510 are aligned in homogeneous texture. The LMW also containes Indiom-Tin-Oxide ITO and rubbed polymide. Assume that $n_{lce} \neq n_{pe}$ and $n_{lco} = n_{po}$. The p-polarization incident light "sees" a Bragg grating with a period $2(n_{lce}+n_{pe}).d$ and is reflected. The S-polarization is passed. However, when voltage is applied, the LMW is re-oriented to have a tilt angle $\phi$. As a result, the P-polarization incident light "sees" an effective refractive liquid crystal index $n_{e|eff}$ which is in between $n_{lce}$ and $n_{lco}$, i.e., $n_{lce} > n_{e|eff} > n_{lco}$. Then the device still reflects p-polarization but at a shifted wavelength $2(n_{e|eff}+n_p).d$. The wavelength shift $\Delta\lambda$ is determined by the change of the liquid crystal index $\Delta n_{lc}$, i.e., $\Delta\lambda = \Delta n_{lc}.\lambda/(n_{lc}+n_p)$. However, since the index for S-polarization remains unchanged, no reflection is observed for the S-polarization. The same wavelength shift shall be observable from the device made from nematic liquid crystal and polymer materials whose intrinsic refractive indices are equal to each other.

(Second Embodiment)

Figure 6:
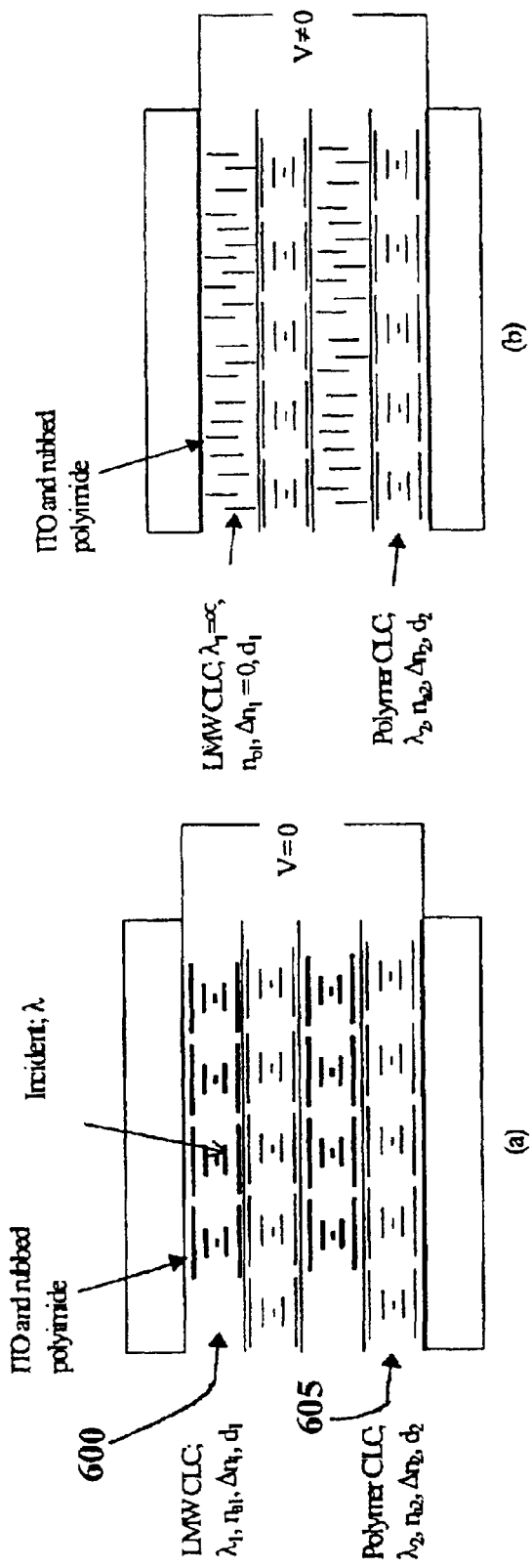
FIGS. 6($a$)–6($b$) illustrate the holographic liquid crystal device according to the presentation made from cholesteric liquid crystals.
Figure 7:
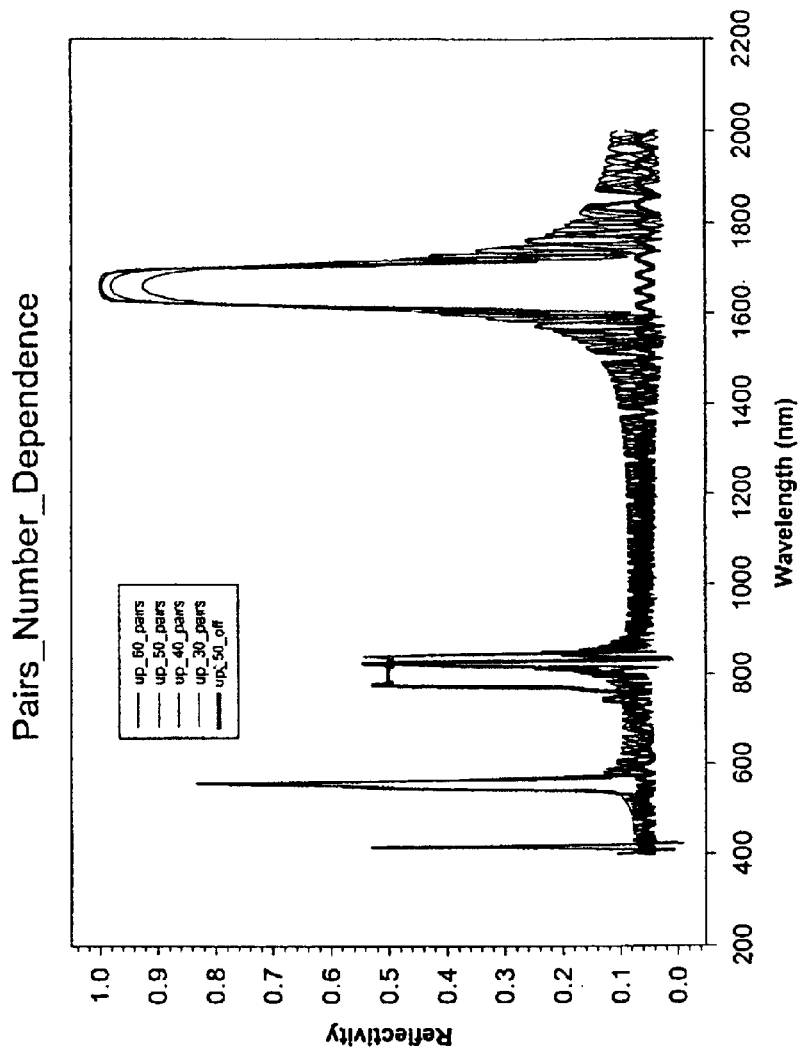
FIG. 7 illustrates computer simulation of the electro-optical response of a holographic device made from cholesteric liquid crystal.

FIG. 6 illustrates the second embodiment of the invention in which the switchable mirror is made from liquid crystals in cholesteric phase under holographic condition. Similar to the first embodiment, the reflection wavelength of this device is electrically tunable. However, different from the first embodiment, this tunable reflection peak is polarization insensitive. The device has a Bragg grating structure consisting of two sets of alternatively spaced CLC planes 600, 605. The two CLC's have the same selective reflection wavelength at $\lambda_1=\lambda_2$, the same an average refractive index $n_{a1}=n_{a2}$, and the same birefringence $\Delta n_1=\Delta n_2$. It is further assumed that one CLC is polymerized into a solid state while the other one is LMW CLC that can be electrically switched. The LMC CLC contains ITO and rubbed polymide. ITO is the electric conductive coating that is optically transparent. The rubbed polyimide is used for liquid crystal alignment. The longer axis of the liquid crystal adjacent to the polyimide layer is aligned along the polyimide rubbing direction. In this process, for example, the polyimide is first spin coated on to the glass substrate with ITO. Then it is baked. Finally it is mechanically rubbed. When V=0, both CLC's are in a planar texture and are exactly identical. As an example, assume that $\lambda_1=\lambda_2=800$ nm, $2n_{a1}d_1=2n_{a2}d_2=800$ nm, $d_1=d_2$, $n_{a1}=n_{a2}=1.6$, and $\Delta n_1=\Delta n_2=0.2$. As a matter of fact, such an arrangement is equivalent to a bulk CLC film without laser induced Bragg structure. A selective reflection at $\lambda=800$ nm should be expected, which has been shown by curve in FIG. 7.

However, when an electric field is applied (i.e., V≠0), the LMW CLC (e.g., $CLC_2$) is aligned in homeotropic texture to show an index $n_{a2}=1.5$. Therefore, $n_{a1}=1.6$, $n_{a2}=1.5$, $\lambda_1=800$ nm, $\lambda_2=\infty$, $2n_{a1}d_1=800$ nm, $2n_{a2}d_2=(n_{a2}/n_1).800$ nm=853 nm, $\Delta n_1=0.2$, $\Delta n_2=0$. The optical thickness, birefringence and refractive index of the LMW CLC are changed and Bragg reflection appears, as has been shown by the computer simulation curves in FIG. 7. Under a sufficiently strong electric field, four Bragg reflection peaks appear within the spectrum region from 400 to 2000 nm. A more careful investigation reveals that these peaks correspond to the fundamental (at 1600 nm), second (around 800 nm), third order (around 530 nm), and forth order (around 400 nm) Bragg reflection. Since the Bragg reflection, particularly at the fundamental order, is insensitive to different incident polarization, this mirror is polarization independent.

The holographic CLC mirror according to the present invention shows a single selective reflection peak under zero voltage by the CLC helix heretofore unknown in the prior art. This reflection is polarization dependent. Once a voltage is applied to the device, multiple orders of Bragg reflection appear with the fundamental peak located at a wavelength almost double of the CLC intrinsic reflection wavelength. Similar discussion to the first embodiment leads to the conclusion that varying the strength of the applied electric field will tune the Bragg reflection wavelength. Finally, the tunable Bragg reflection is totally polarization independent.

This mirror can be fabricated via the following procedure from a mixture containing liquid crystal and pre-polymers in liquid crystal phase together with suitable chiral additive which induces/modifies the CLC helical pitch. Exemplary liquid crystals are BL038, E7, E44 and TL205 (from EMI, Industries), the exemplary chiral additives are CB15, R1011, R811, and exemplary pre-polymers are siloxane and acrylate based compounds that are in cholesteric phase. Visible or IR photo initiator is needed to initiate the polymerization under a visible or IR laser source. Exemplary visible photo initiators are Rose Bengal, and N-Phenylglycine (used as a co-initiator) suitable for an argon laser at 514.5 nm.

Figure 8:
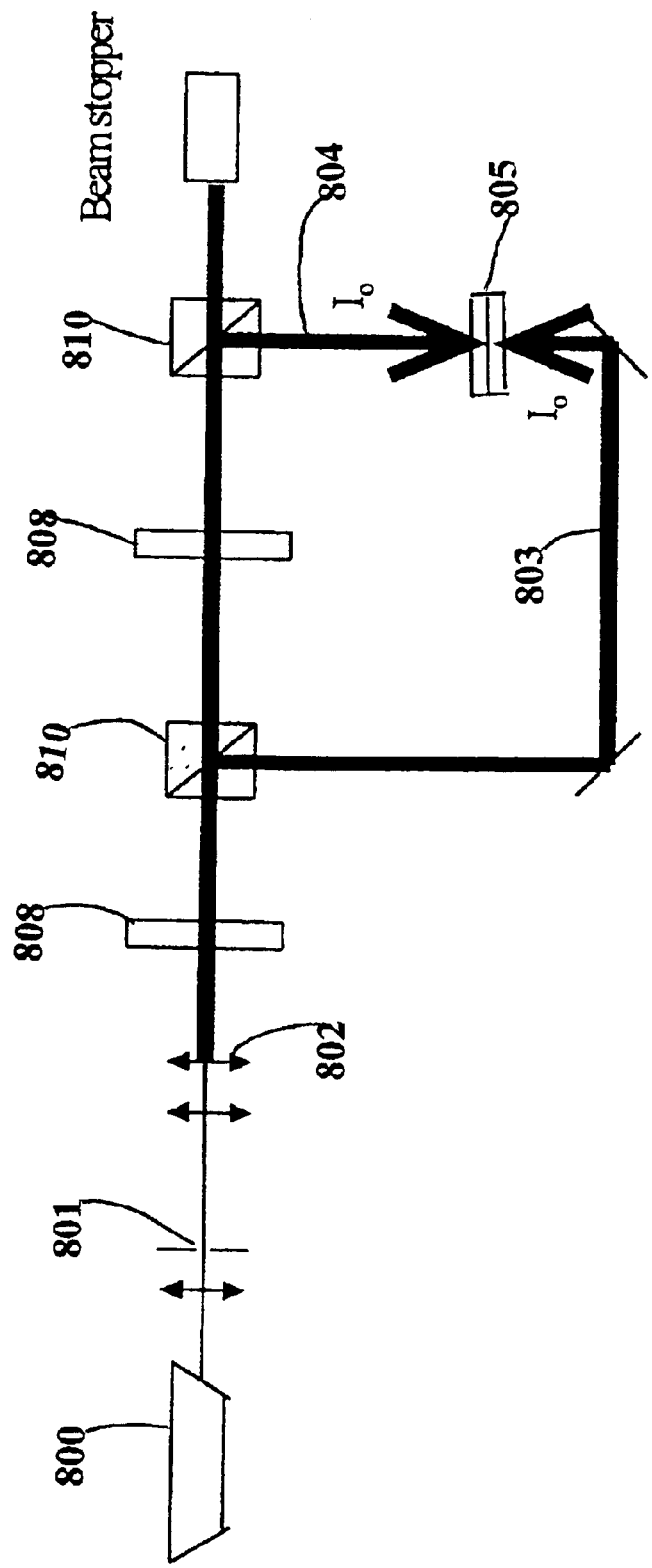
FIG. 8 illustrates experimental setup for making holographic CLC mirror.

FIG. 8 shows one way that a set up can be arranged for making a holograph CLC mirror according to the present invention. The liquid crystal and pre-polymerized liquid crystal are mixed at a given ratio. The mixture is filled into a glass cell with a gap thickness around thirty microns. Then the sample is exposed under a holographic condition where two oppositely propagating laser beams are used, as shown in FIG. 8.

In the setup, the laser beam from laser 800 is split into two beams after passing through a spatial filler 801 and beam expander 802. The two beams 803, 804 are directed onto the liquid crystal sample 805 from opposite direction to form an interference pattern. The beam intensity can be regulated via a combination of a half wave plate 808 with a polarizing beam splitter (PBS) 810. The two beams are desired to have a substantially equal intensity and are spatially overlapped over the same sample area. After exposure for several minutes depending on the laser intensity, the holographic CLC mirror is fabricated.

Figure 9:
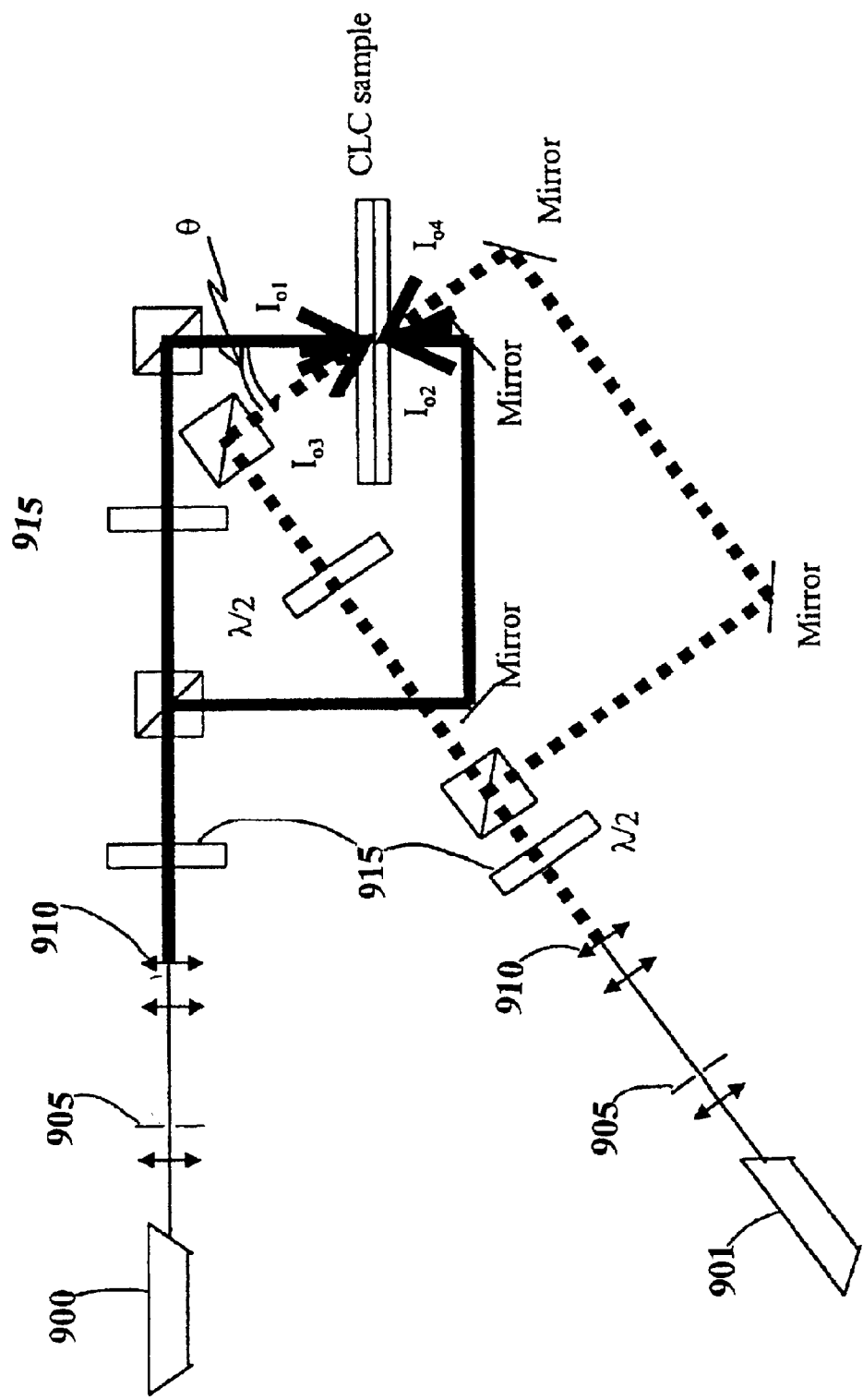
FIG. 9 illustrates experimental setup for making Holographic CLC mirror with broadened bandwidth by employing two independent lasers.

FIG. 9 illustrates another aspect of the invention which is the creation of a broadened reflection bandwidth via a multiple laser beam exposure scheme. In order to avoid the unnecessary interference between the two laser beams incident from the same side (i.e., between $I_{o1}$ and $I_{o3}$, and between $I_{o2}$ and $I_{o4}$) to form a transmission grating, two independent lasers are used which could have the same or different wavelength since they are incoherent 900, 901. The spatial fillers and beam expander half wave plate 915, and PBS 920 are arranged as previously described.

Figure 10:
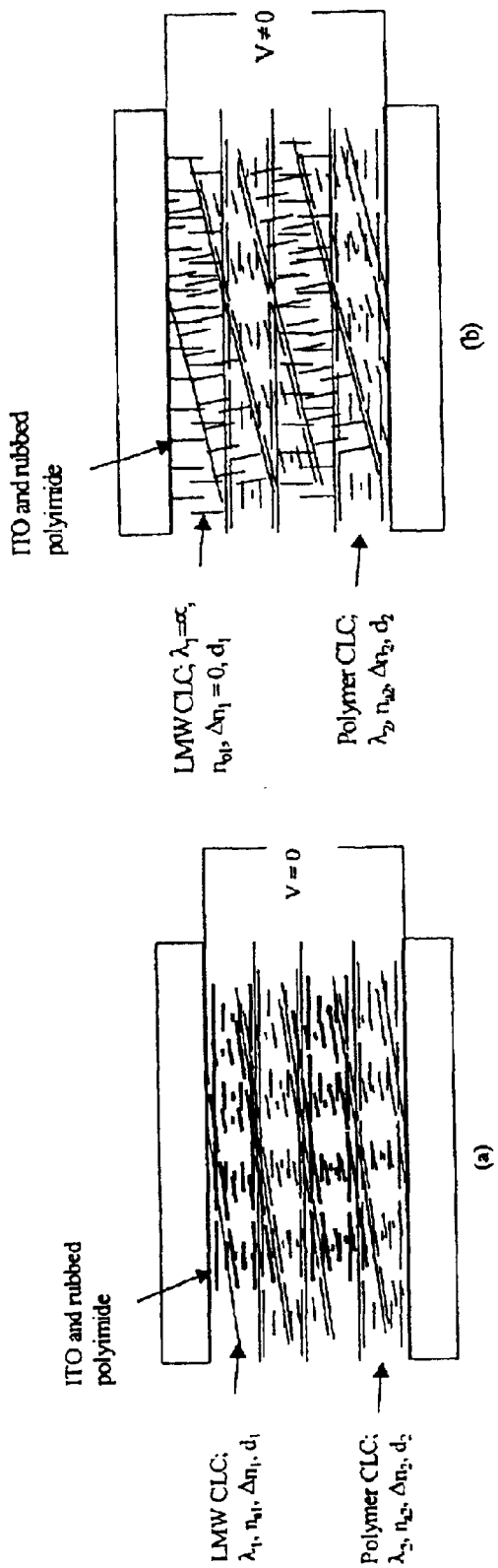
FIGS. 10($a$)–10($b$) illustrate exemplary illustration showing two sets of Bragg gratings formed via multiple beam holographic exposure.

FIG. 10 shows the resulted holographic CLC mirror that has multiple sets of Bragg structures which are super imposed to each other. Under zero voltage, the CLC helixes inside the gratings are all oriented along the surface normal. Since all the CLC's are assumed to have the same pitch, birefringence, refractive index, those gratings are not distinguishable from each other. Therefore, the device still behaves like a bulk CLC and reflects circular polarization at the intrinsic CLC wavelength. Once the mirror is switched by an electric field, all the LMW CLC's are aligned along the field direction. The CLC gratings with different orientation are then distinguishable from each other and reflect at different wavelengths. If the Bragg reflection peaks from the gratings are close enough to each other so that they are partially overlapped to form an equivalent single reflection peak, its bandwidth is broadened. The angle θ between $I_{o1}$ and $I_{o3}$, or between $I_{o2}$ and $I_{o4}$ determines the orientation angle between the two Bragg gratings, which further determines the spectral separation of the Bragg reflection from the gratings. In another word, this angle determines the final reflection bandwidth.

It should be mentioned that the multiple gratings could also be created via different lasers at different wavelength even though the gratings are oriented in the same direction. For example, one grating can be formed using two opposite laser beams at 514.5 mm from $Ar^+$ laser. The second grating can be formed by another pair of oppositely propagating beams at 632.8 nm from Ne—He. Both Ar and HeNe beams could be collinear.

This single layer polarization independent switchable mirror made from cholesteric liquid crystal gratings created under holographic condition serves as the fundamental element for building the optical switch array according to the present invention, as described in the third embodiment. The technique described above is of particular value as it assures that the gratings thus formed exhibit the desired identity in orientation that contributes to the improved quality and performance of the resulting switch devices. The following describes the details.

(Third Embodiment) Optical Switch Array

Figure 11:
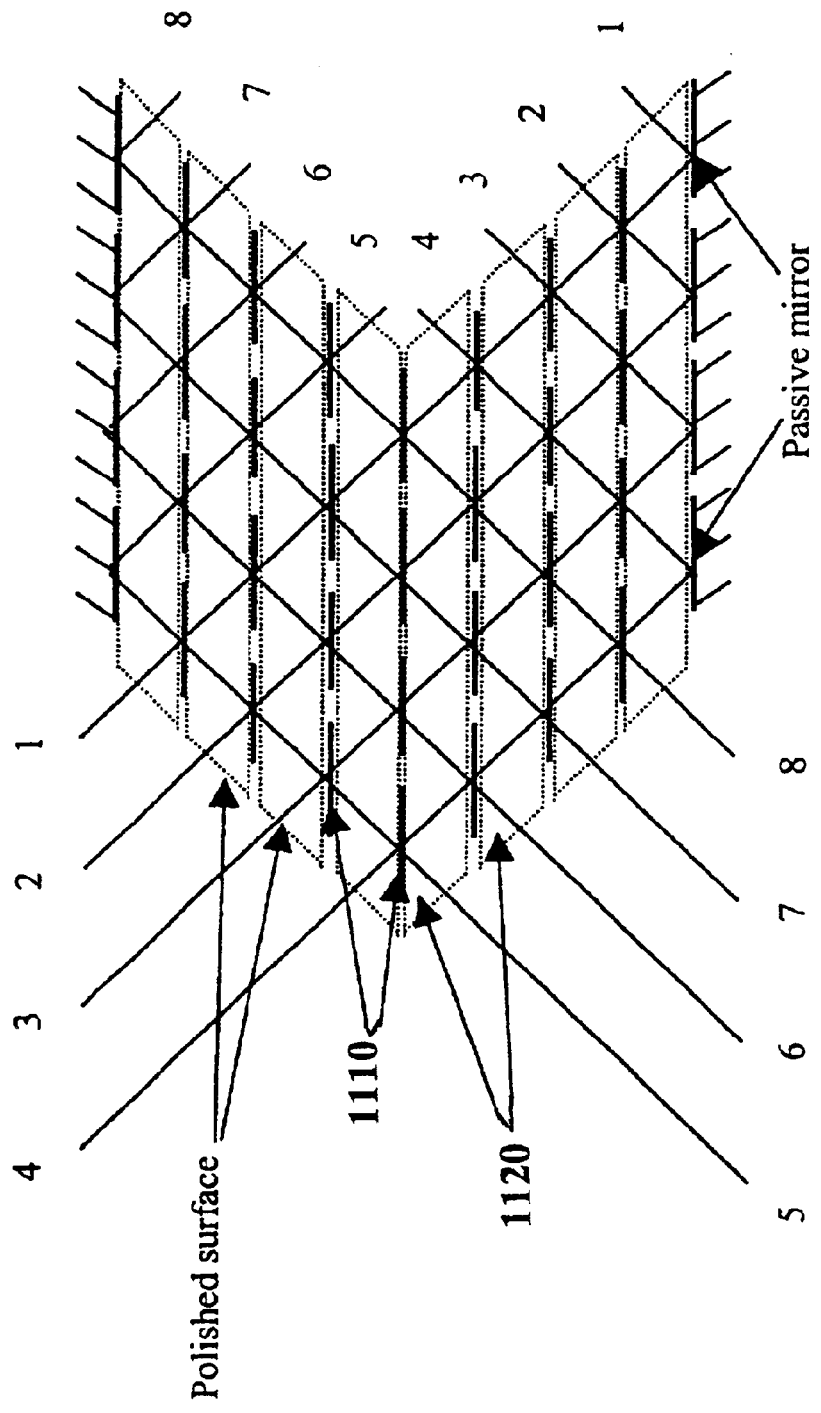
FIG. 11 is a schematic illustration of an 8×8 switch array.

FIG. 11 shows a schematic of the desired switch array configuration according to the present invention, where an 8×8 switch is illustrated as an example. It should be noted that although there may be an alternative arrangement for the mirror elements, however, the spirit using the single layer switchable mirror to build the switch array remains the same.

The switch array 1100 is made from switchable mirror elements which are further made from holographic cholesteric liquid crystal. The mirror elements are sandwiched between solid substrates 1120 (e.g., glass and/or plates) and are electrically isolated from each other by using pixilated conductive electrodes, such as Indium-Tin-Oxide (ITO). Each mirror element is independently addressed in a similar way used in liquid crystal display. In order to avoid the beam alignment problem such as that encountered with MEMs technology, the following fabrication method is invented.

Figure 12:
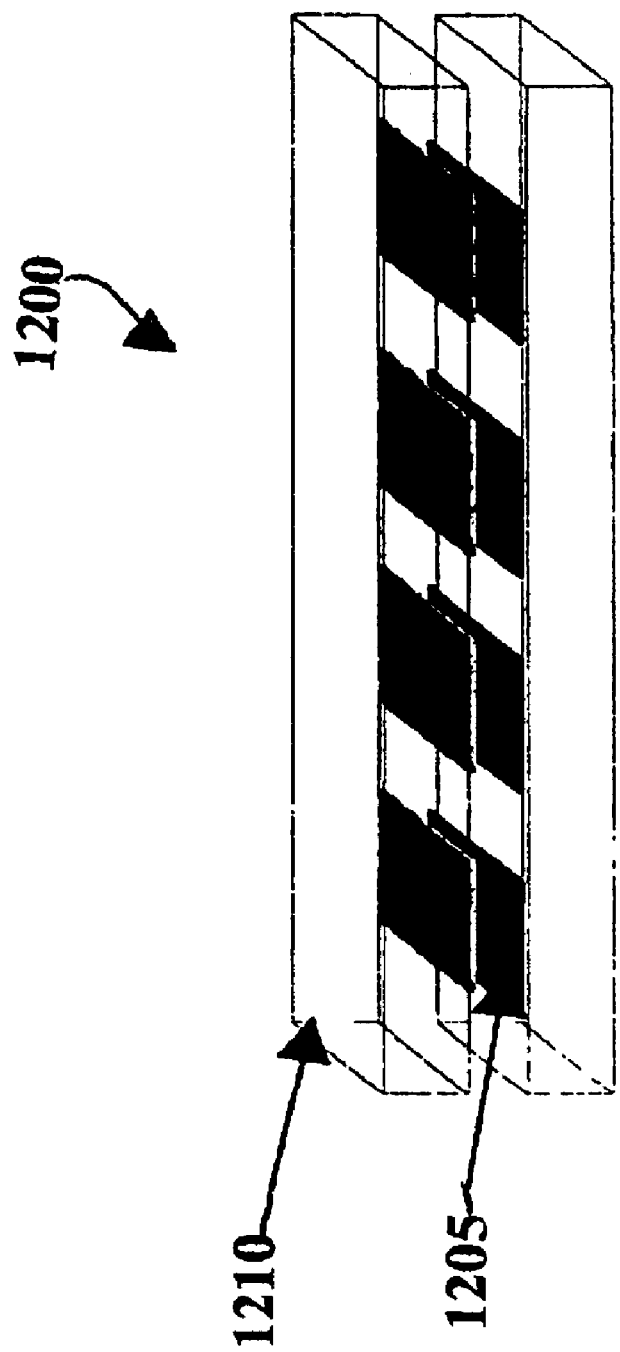
FIG. 12 illustrates exemplary empty liquid crystal cell with four pairs of electrode.

FIG. 12 illustrates the individual empty liquid crystal cells 1200. While each cell has the structure as shown by the four pairs of electrodes 1205, this number has been selected only for illustration purposes and does not limit the number of electrodes which could be fewer than four, or any number larger than the electrodes are arranged on substrate 1210.

The empty cells are then stacked, aligned to a proper position to each other and fixed to each other using the similar way used in LCD fabrication.

Figure 13:
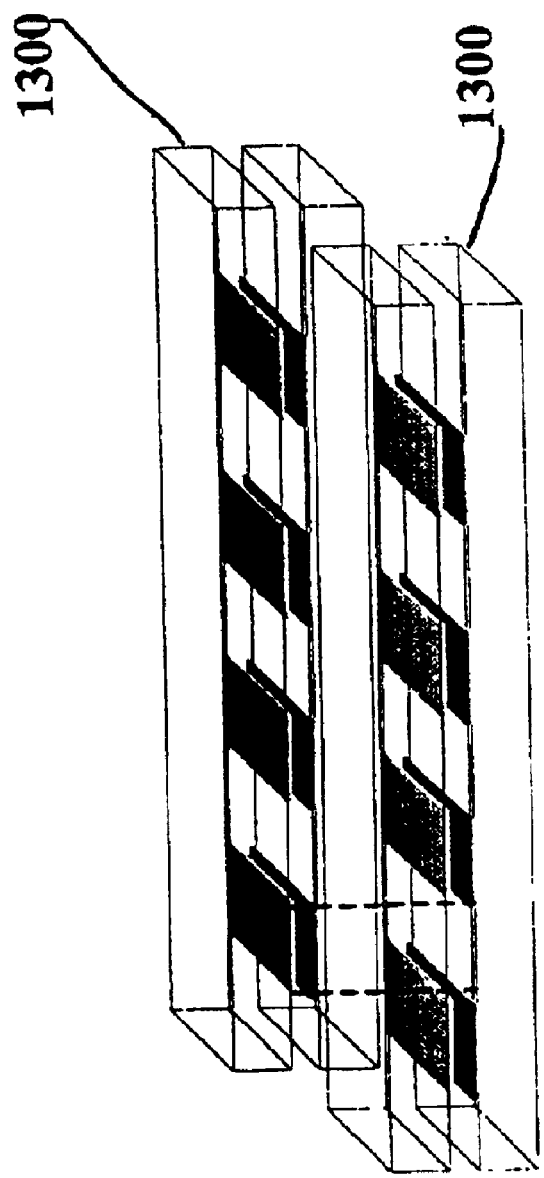
FIG. 13 illustrates aligned and stacked liquid crystal cells.

FIG. 13 shows the stacked and aligned liquid crystal cells 1300, where only two cells are shown as an example.

Figure 14:
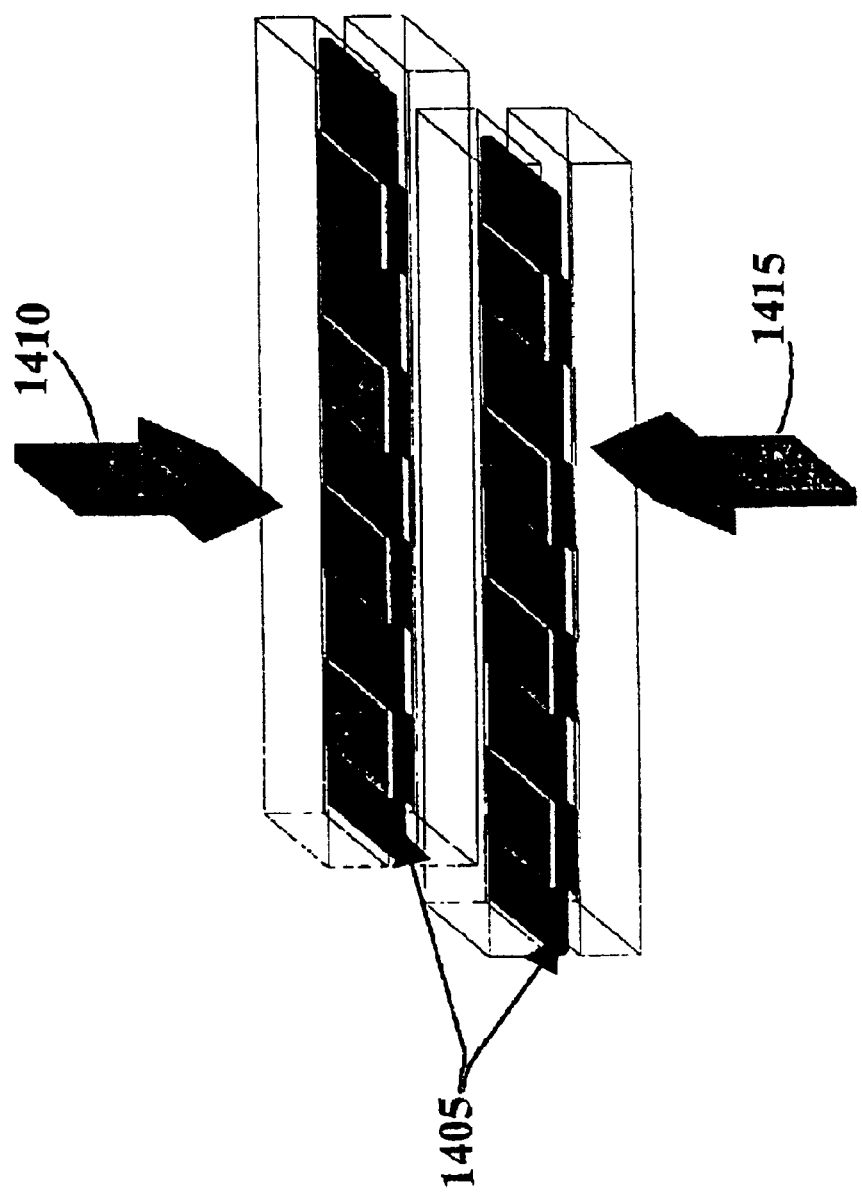
FIG. 14 illustrates holographic exposure of the stacked liquid crystal cells to form an optical switch array.

FIG. 14 illustrates how the structure looks after the step of filling liquid crystal mixture 1405 into the stacked cells by techniques similar to those used in LCD industry. Finally, the whole device is holographically exposed under laser beams 1410, 1415 as shown in FIG. 14.

Figure 15:
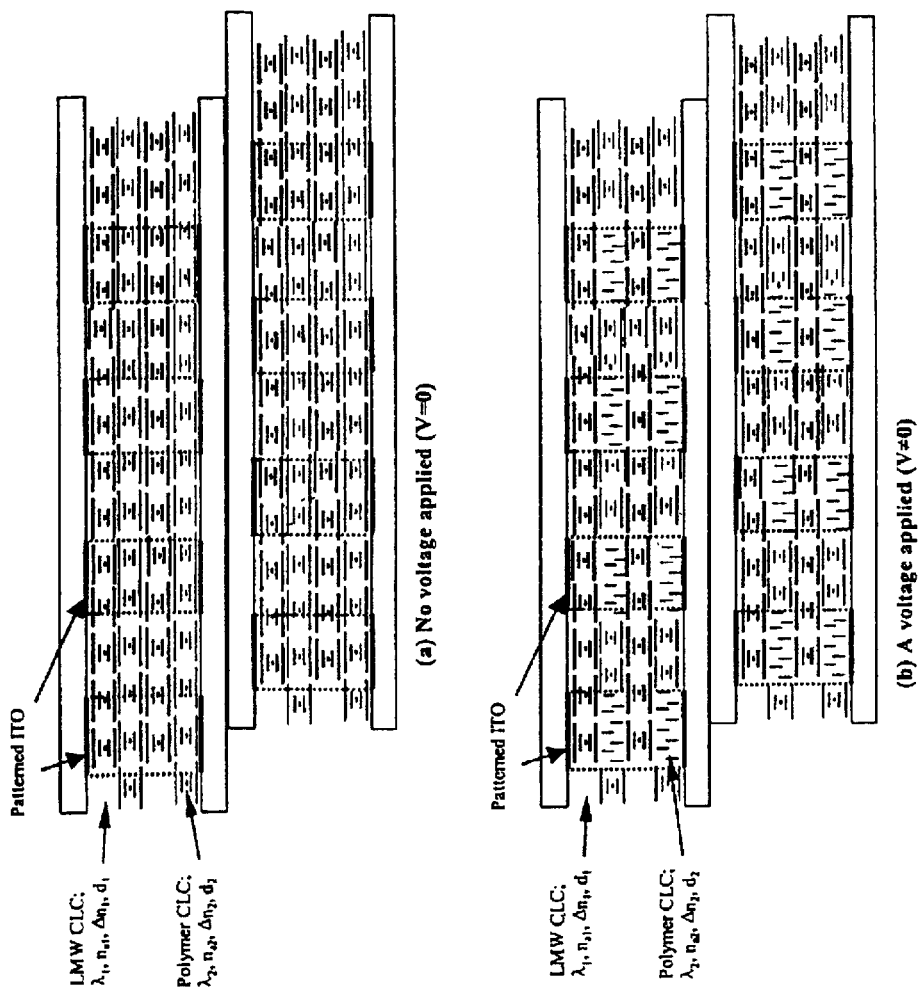
FIGS. 15($a$) –15($b$) illustrates a fabricated optical switch array whose mirror elements are strictly parallel to each other.

FIGS. 15(a) and (b), illustrates how such fabricated Bragg gratings in different pixels and in different layers are strictly oriented in the same direction because they are created under the same holographic patterns. Since the beam reflection direction from each pixel is determined by the orientation of the holographic grating plane, the reflected light from different mirror elements will be guaranteed in the same direction if the incident beams onto different mirror elements are parallel to each other. Thus, while individual substrates might exhibit minor variation in surface parallelism, this has no effect on the characteristics and performance of the assembled device, as the essential orientation of the Bragg gratings is identical. This is achieved by the application of two oppositely originating beams and their convergence on the workpiece during fabrication as described and illustrated herein.

It is understood by persons of ordinary skill in the art that there are many variations to the present invention which are within the spirit of the invention and the scope of the appended claims. For example, as an alternative, the switch can be made of switchable mirror elements from nematic liquid crystal material. However, in order to reflect an un-polarized light, two orthogonally oriented sub-switching elements are needed to form a complete switching element. The liquid crystal orientation direction of the two sub-switching elements is perpendicular to each other under zero voltage. The same cell preparation, liquid crystal filling, and holographic exposure procedures as described previously are applied in fabricating the final switch array. In addition, the number of beams used in the holographic process, the actually substrate used in the array, the holographic patterns can be varied according to need.

What is claimed is:

1. An optical router switch array comprising:
   a plurality of switchable mirror elements for reflecting and transmitting an incident beam of light; the plurality of switchable elements comprising a holographic liquid crystal in stacked cells;
   said mirror elements having alternating liquid crystal polymer and LMWLC layers;
   said mirror elements being disposed as side by side groups in each said stacked cell;
   a pair of substrates sandwiching each stacked cell and thereby spacing the said side by side groups of mirror elements in the cell from side by side groups of mirror elements of other stacked cells; and
   each one mirror element of said plurality of switchable mirror elements including pixilated electrodes at said sandwiching substrates that are electrically isolated from pixilated electrodes of other switchable mirror elements of said plurality of switchable mirror elements.

2. The device according to claim 1, wherein said holographic liquid crystal in each individual liquid crystal cell in the stacked cells is individually formed by exposing to holography prior to stacking at predetermined incident angles to form holographic gratings having a predetermined pattern.

3. The device according to claim 2, wherein the holographic gratings comprise Bragg gratings.

4. The device according to claim 3, wherein the liquid crystal of the Bragg gratings are in cholesteric phase and the holographically formed patterns in the liquid crystal of the Bragg gratings are formed via multiple beams holographic exposure for tuning Bragg reflection according to variations in an electric field.

5. The device according to claim 3, wherein the Bragg gratings are formed by converging oppositely-directed laser beams in the liquid crystal of the stacked cells.

6. The device according to claim 2, wherein the holographic gratings are formed by converging oppositely-directed laser beams in the liquid crystal of the stacked cells.

7. The device according to claim 1, wherein said holographic liquid crystal in the stacked cells is formed by exposing the stacked cells to holography at predetermined incident angles to form holographic gratings having a predetermined pattern.

8. The device according to claims 7, wherein the orientation of the holographic gratings is in the same direction.

9. The device according to claim 8, wherein the holographic gratings comprise Bragg gratings.

10. The device according to claim 9, wherein the liquid crystal of the Bragg gratings are in cholesteric phase and the holographically formed pattern in the liquid crystal of the Bragg gratings formed via multiple beam holographic exposure for tuning Bragg reflection according to variations in an electric field.

11. The device according to claim 9, wherein the liquid crystal of the Bragg grating are in nematic phase and the Bragg gratings are formed by converging oppositely-directed laser beams in the liquid crystal of the stacked cells.

12. The device according to claim 8, wherein the liquid crystal of the Bragg gratings are in nematic phase and the holographic gratings are formed by converging oppositely-directed laser beams in the liquid crystal of the slacked cells.

13. The device according to claims 7, wherein the mirror elements in the stacked cells are aligned parallel to each other.

14. The device according to claim 7, wherein the holographic gratings comprise Bragg gratings.

15. The device according to claim 14, wherein the liquid crystal of the Bragg gratings are in cholesteric phase and the holographically formed patterns in the liquid crystal of the Bragg gratings formed via multiple beam holographic exposure for tuning Bragg reflection according to variations in an electric field.

16. The device according to claim 14, wherein the liquid crystal of the Bragg gratings are in cholesteric phase and the Bragg gratings are formed by converging oppositely-directed laser beams in the liquid crystal of the stacked cells.

17. The device according to claim 7, wherein the liquid crystal of the Bragg gratings are in cholesteric phase and the holographic gratings are formed by converging oppositely-directed laser beams in the liquid crystal of the stacked cells.

18. The device according to claim 7, wherein the liquid crystal of the Bragg gratings are in cholesteric phase and said cholesteric liquid crystal comprises a composite material of a non-polymeric low molecular weight (LMW) material and liquid crystal polymer.

19. The device according to claim 17, wherein said composite material is included in a cell with rubbed polyimide.

20. The device according to claim 7, wherein the liquid crystal of the Bragg gratings are in cholesteric phase and said cholesteric liquid crystal consists of a composite material of non-polymeric low molecular weight (LMW) and a liquid crystal polymer.

21. The device according to claim 1, wherein the pixilated electrodes comprise Indium-Tin-Oxide (ITO).

22. The device according to claim 1, wherein the mirror elements in the stacked cells are aligned parallel to each other.

23. A method for manufacturing an optical router switch array comprising the steps of
(a) providing a plurality of switchable mirror elements comprising a liquid crystal housed in a plurality of stacked cells;
(b) providing a plurality of substrates which are alternately arranged with said stacked cells so that each one of said plurality of switchable mirror elements is arranged between two substrates of said plurality of substrates and separated from switchable mirror elements of all other stacked cells of said plurality of stacked cells;
(c) providing pixilated electrodes for said each one of said plurality of switchable mirror elements which are electrically insulated from pixilated electrodes of said all other mirror elements of said plurality of switchable mirror elements; and
(d) exposing the liquid crystal in the assembly resulting from performance of steps (a) through (c) to holography at predetermined angles from at least two incident beams to form holographic gratings having a predetermined pattern.

24. The method according to claim 23, wherein step (a) includes:
(i) stacking a plurality of empty cells;
(ii) aligning the empty cells stacked in step (i);
(iii) affixing the aligned stack of empty cells together; and
(iii) filling the empty cells with a liquid crystal mixture.

25. The method according to claims 23, wherein step (a) includes the substeps in any order of filling the cells with a liquid crystal mixture, stacking the cells, aligning the cells, and affixing the cells to each other.

26. The method according to claim 23, wherein the liquid crystal recited in step (a) is a cholesteric liquid crystal.

27. The method according to claim 26, wherein the mirror elements in said plurality of stacked cells are aligned parallel to each other.

28. The method according to claim 26, wherein the holographic liquid crystal comprises a mixture of cholesteric liquid crystal material and a pre-polymerized liquid crystal.

29. The method according to claim 28, wherein the holographic liquid crystal further comprises a chiral additive, and said pixilated substrates in step (c) comprises Indium-Tin-Oxide (ITO).

30. The method according to claim 26, wherein said plurality of substrates provided in step (b) comprise glass plates.

31. The method according to claim 26, wherein said plurality of substrates provided in step (b) comprise plastic plates.

32. The method according to claim 26, wherein the holographic gratings comprise Bragg gratings.

33. The method according to claim 32, wherein the Bragg gratings are formed in step (d) via multiple beam holographic exposure for tuning a Bragg reflection of said grating to respond to variations in an applied electric field.

34. The method according to claim 33, wherein power values used during multiple beam holographic exposure is different.

35. The method according to claim 26, wherein the number of beams used for holography in step (d) is two, and said beams being propagated in opposite direction that converge in the stacked cells.

36. The method according to claim 26, wherein said at least two beams originate from different light sources.

37. The method according to claim 26, wherein said at least two beams originate from a single beam of light and are split by a beam splitter.

38. The method according to claim 26, wherein said at least two beams originate from a single beam of light and pass through a spatial filter, a beam expander and a beam splitter.

39. The method according to claim 26, wherein said at least two beams originate from a single beam of light and pass through a spatial filter, a beam expander, a half-waveplate and a beam splitter.

40. The method according to claim 23, wherein the liquid crystal recited in step (a) is a nematic liquid crystal.

41. The method according to claim 40, wherein the mirror elements in said plurality of stacked cells are aligned parallel to each other.

42. The method according to claim 40, wherein the holographic gratings comprise Bragg gratings.

43. The method according to claim 42, wherein the Bragg gratings are formed in step (d) via multiple beam holographic exposure for tuning a Bragg reflection of said grating to respond to variations in an applied electric field.

44. The method according to claim 43, wherein power values used during multiple beam holographic exposure is different.

45. The method according to claim 40, wherein the number of beams used for holography in step (d) is two, and said beams being propagated in opposite direction that converge in the stacked cells.

46. The method according to claim 23, wherein the mirror elements in said plurality of stacked cells are aligned parallel to each other.

47. The method according to claims 23, wherein the holographic gratings comprise Bragg gratings.

48. The method according to claim 47, wherein the Bragg gratings are in step (d) formed via multiple beam holographic exposure for tuning a Bragg reflection of said grating to respond to variations in an applied electric field.

49. The method according to claim 48, wherein power values used during multiple beam holographic exposure is different.

50. The method according to claim 23, wherein the number of beams used for holography in step (d) is two, and said beams being propagated in opposite direction that converge in the stacked cells.

51. The method according to claim 23, wherein said at least two beams originate from different light sources.

52. The method according to claim 23, wherein said at least two beams originate from a single beam of light and are split.

53. The method according to claim 23, wherein said at least two beams originate from a single beam of light and pass through a spatial filter, a beam expander and a beam splitter.

54. The method according to claim 23, wherein said at least two beams originate from a single beam of light and pass through a spatial filter, a beam expander, a half-waveplate and a beam splitter.

* * * * *